April 15, 1924.
H. A. THOMPSON
AUTOMOTIVE BRAKE
Filed Jan. 7, 1922
1,490,145
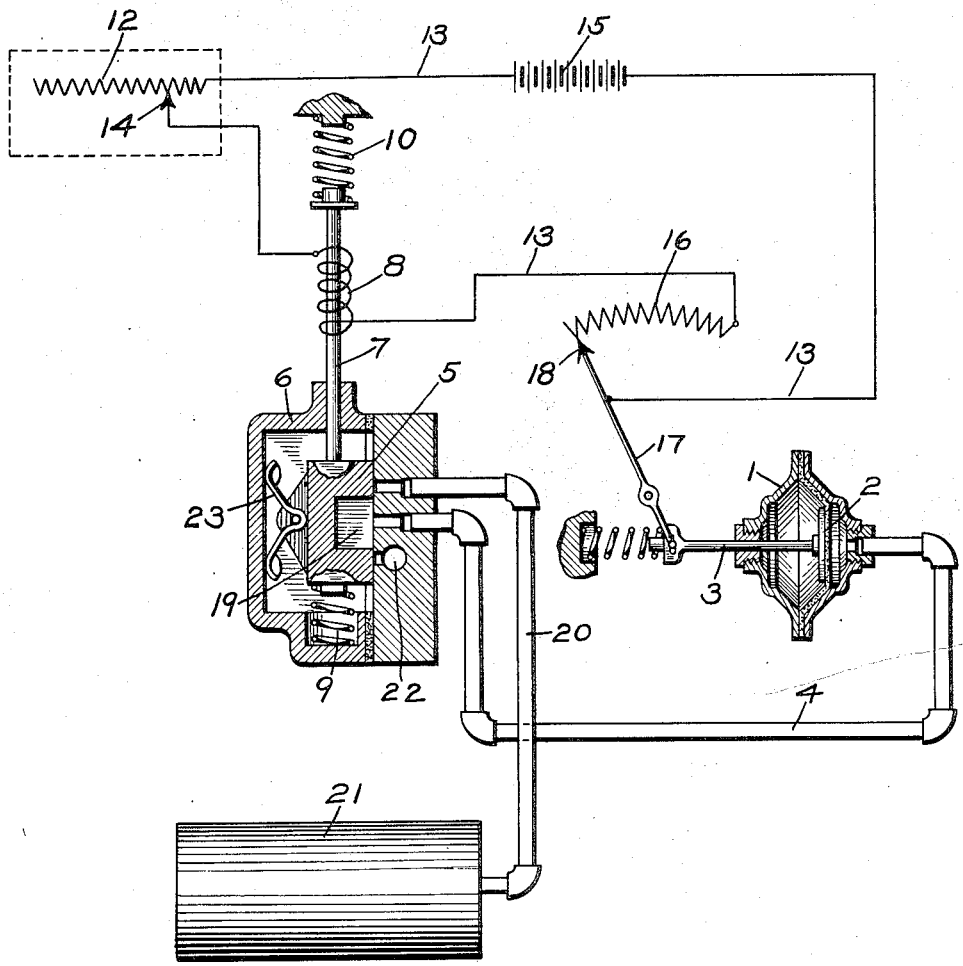
INVENTOR
HOWARD A. THOMPSON
BY Wm. M. Cady
ATTORNEY Patented Apr. 15, 1924.

1,490,145

UNITED STATES PATENT OFFICE.

HOWARD A. THOMPSON, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed January 7, 1922. Serial No. 527,730.

*To all whom it may concern:*

Be it known that I, HOWARD A. THOMPSON, a citizen of the United States, residing at Pittsburgh, in the county of Allegheny and State of Pennsylvania, have invented new and useful Improvements in Automotive Brakes, of which the following is a specification.

This invention relates to an electro-pneumatic brake more particularly adapted for an automotive brake system.

The principal object of my invention is to provide improved means for electrically controlling the brakes.

In the accompanying drawing, the single figure is a diagrammatic view, partly in section, of an electro-pneumatic brake equipment embodying my invention.

According to my invention, means are provided for electrically controlling fluid pressure brakes, in which fluid under pressure is supplied to and released from the brake cylinder by varying the resistance in a circuit and the fluid pressure is maintained in the brake cylinder at a predetermined degree regardless of leakage by automatically varying an auxiliary resistance in the circuit according to variations in pressure in the brake cylinder.

As shown in the drawing, a brake cylinder of the diaphragm type may be provided, comprising a casing 1, containing a flexible diaphragm 2, having a rod 3 which is operatively connected to the brake rigging in the usual manner. Connected to the pressure side of the diaphragm is a pipe 4 through which fluid under pressure is supplied to and released from the diaphragm. A slide valve 5, contained in a casing 6, controls the admission and release of fluid under pressure to and from the pipe 4 and associated with the operating stem 7 of the slide valve is an electric solenoid coil 8. Within the casing 6 is mounted a coil spring 9 which acts on the valve 5 in opposition to the force of the solenoid 8 and a light coil spring 10 may be provided to act on the valve stem 7 in opposition to the spring 9 for the purpose of preventing effects on the valve device due to vibration of the vehicle.

A suitable resistance element 12 may be associated with the steering column of the vehicle and has one terminal connected to a circuit wire 13, the resistance in the circuit being varied by means of a manually operated movable contact 14. The circuit includes the solenoid coil 8, a source of current 15, and an auxiliary resistance element 16.

For controlling the auxiliary resistance a pivoted contact arm 17 is provided, which is operatively connected to the piston rod 3 of the brake cylinder, so that the contact 18 is moved to correspond with the movement of diaphragm 2.

The valve 5 is provided with a cavity 19 which in one position connects a pipe 20 leading to a source of fluid pressure 21, to pipe 4 and in release position connects pipe 4 with an exhaust port 22. The solenoid coil 8 is such that when energized, the force thereof tends to move the slide valve 5 against the resistance of spring 9 and when deenergized permits the spring 9 to move the valve toward application position.

In operation, with the brake cylinder diaphragm 2 in release position, as shown in the drawing, the contact 18 is in position for cutting all of the resistance 16 into the circuit. If it is desired to effect an application of the brakes, the contact 14 is moved so as to cut a certain amount of resistance into the circuit. This causes a weakening of the current through the solenoid coil 8 and the force exerted thereby. The spring 9 then shifts the valve 5 so as to connect pipe 20 with pipe 4, permitting fluid under pressure to be supplied from the source of pressure 21 to the brake cylinder 1. As the diaphragm 2 moves out to apply the brakes, the contact arm 17 is shifted, so that contact 18 is moved to cut a portion of the resistance 16 out of the circuit. This tends to increase the current flow through the solenoid coil 8 so that the force opposing the spring 9 is increased and finally when the amount of resistance cut out of the circuit by the movement of contact 18 corresponds with the amount of resistance previously cut into the circuit by the movement of the contact 14, the valve 5 will be shifted to the lap position as shown in the drawing, cutting off the further supply of fluid to the brake cylinder.

A certain degree of pressure is thus attained in the brake cylinder and if it is desired to increase the brake cylinder pressure the contact 14 may be shifted to cut an additional amount of resistance into the circuit, causing the valve 5 to be again shifted to application position, and the contact 18 to be moved by the diaphragm 2 to cut out a corresponding amount of resistance at the resistance element 16 and again cause the movement of the valve 5 to lap position.

If leakage from the brake cylinder should occur, the contact 18 will be shifted by the movement of the diaphragm 2 toward release position, so as to increase the resistance in the solenoid circuit and thereby cause a movement of slide valve 5 to application position by the spring 9. Fluid under pressure is then supplied to the brake cylinder to compensate for the leakage and as the brake cylinder pressure is restored, the arm 17 moves the contact 18 so as to again reduce the resistance in the circuit and thereby cause an increased current flow through the solenoid 8 so that the increased force of the solenoid acts to move the valve 5 back to lap position.

In order to release the brakes, the contact 14 is moved in a direction to reduce the resistance in the solenoid circuit and thereby so increase the force of the solenoid that the valve 5 will be moved to a position in which the pipe 4 is connected to the exhaust port 22.

If current in the solenoid circuit should fail for any reason, the deenergization of the solenoid will permit the spring 9 to shift the valve 5 to application position, so that the brakes will be applied.

In order to prevent possible lifting of the slide valve 5 from its seat by air pressure acting on the face of the valve, a spring 23 may be provided, which tends to maintain the valve on its seat.

Having now described my invention, what I claim as new and desire to secure by Letters Patent, is:—

1. In an electro-pneumatic brake, the combination with a brake cylinder, of a valve device for controlling the fluid pressure in the brake cylinder, electric means for operating said valve device, and a regulating device controlled by brake cylinder pressure for varying the operating force of said means.

2. In an electro-pneumatic brake, the combination with a brake cylinder, of a valve device for controlling the fluid pressure in in the brake cylinder, an electric solenoid for operating said valve device, and means operated according to variations in brake cylinder pressure for varying the strength of said solenoid.

3. In an electro-pneumatic brake, the combination with a brake cylinder, of a valve device for controlling the admission and release of fluid under pressure to and from the brake cylinder, an electric solenoid for operating said valve device, and means controlled by brake cylinder pressure for varying the resistance in the circuit of the solenoid.

4. In an electro-pneumatic brake, the combination with a brake cylinder, of an electric solenoid, a spring, a valve device subject to the opposing forces of the solenoid and the spring for controlling the fluid pressure in the brake cylinder, and means controlled by variations in brake cylinder pressure for varying the current in the solenoid.

5. In an electro-pneumatic brake, the combination with a brake cylinder, of a valve device for controlling the admission and release of fluid under pressure to and from the the brake cylinder, a spring tending to move said valve device to supply fluid to the brake cylinder, an electric solenoid, the force of which tends to move the valve device to release fluid from the brake cylinder, and means governed according to variations in brake cylinder pressure for varying the force of the solenoid.

6. In an electro-pneumatic brake, the combination with a brake cylinder, of a valve device for controlling the fluid pressure in the brake cylinder, electric means for operating said valve device, a manually operated device for varying the force of said electric means, and a device controlled by brake cylinder pressure for also varying the force of said electric means.

7. In an electro-pneumatic brake, the combination with a brake cylinder, of a valve device for controlling the fluid pressure in the brake cylinder, an electric solenoid for operating said valve device, manually operated means for varying the force of said solenoid, and means operated according to variations in brake cylinder pressure for also varying the force of said solenoid.

8. In an electro-pneumatic brake, the combination with a brake cylinder, of a valve device for controlling the admission and release of fluid under pressure to and from the brake cylinder, and having a bias to the position for supplying fluid to the brake cylinder, an electric solenoid, the energization of which tends to move the valve device to release position, manually operated means for varying the resistance in the solenoid circuit, and means operated upon an increase in brake cylinder pressure for reducing the resistance in the solenoid circuit.

9. In an electro-pneumatic brake, the combination with a valve device for controlling the fluid pressure brakes, of electrically controlled means for operating said valve device, a manually operated device for varying the resistance in the circuit of said means, and a device controlled by brake cylinder pressure for also varying the resistance in said circuit.

In testimony whereof I have hereunto set my hand.

HOWARD A. THOMPSON.